Patented Jan. 13, 1953

2,625,571

UNITED STATES PATENT OFFICE 2,625,571

DI-(ALKYLPHENYL)-ALKENES

Herman Pines and Vladimir N. Ipatieff, Chicago, Ill., assignors to Universal Oil Products Company, Chicago, Ill., a corporation of Delaware No Drawing. Application June 21, 1951,
Serial No. 232,884

3 Claims. (Cl. 260—668)

This application is a continuation-in-part of our copending application Serial Number 99,578 filed June 16, 1949, now Patent No. 2,578,207, December 11, 1951.

This invention relates to di-(alkylphenyl)-alkenes and to a process for preparing the same.

This invention is based upon the discovery of a novel class of aromatic compounds containing olefinic unsaturation that may be reacted with chlorine to produce insecticides, that may be reacted with formaldehyde, and other aldehydes, to yield resins, and that may be employed as intermediates in the production of pharmaceuticals and dyes.

An object of this invention is to produce a di-(alkylphenyl)-alkene.

Another object of this invention is to produce an alkylphenyl-alkyl cycloalkalkyl phenyl-cycloalkyl-alkene.

Still another object of this invention is to produce 1 - (4 - methylphenyl) - 1 - (2-methyl-5-(2-cyclohexylpropyl) - phenyl) - 2 - cyclohexyl - 1-propene.

One embodiment of this invention relates to a di-(alkylphenyl)-alkene having the formula:

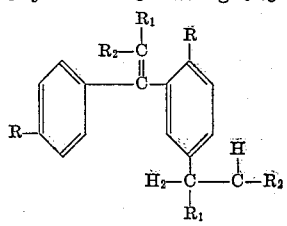

wherein R represents a straight chain alkyl group, $R_1$ represents a member of the group consisting of an alkyl group and a cycloalkyl group, and $R_2$ represents a cycloalkyl group.

A further embodiment of this invention relates to a 1 - (4 - alkylphenyl) -1-(2-alkyl-5-cycloalkalkyl) -phenyl-2-cycloalkyl-1-alkene in which the alkene group contains at least 3 carbon atoms.

A still further embodiment of this invention relates to 1-(4-methylphenyl)-1-(2-methyl-5-(2-cyclohexylpropyl) - phenyl) - 2 - cyclohexyl - 1-propene.

The methods of synthesis which may be used for preparing di-(alkylphenyl)-alkenes containing cycloalkyl groups comprise known steps including halogenation of a cycloalkalkyl benzene hydrocarbon to an aryl halide in which the halogen is preferably bromine or chlorine, and reaction of this aryl halide with a cycloalkalkyl aryl ketone by the Grignard method to form a di-(alkylphenyl)-alkanol containing cycloalkyl substituents which is then dehydrated to yield the di-(alkylphenyl)-alkene as indicated schematically by the following equations which illustrate the synthesis of 1-para-tolyl-1-(2-methyl-5-(2-cyclohexylpropyl) - phenyl) - 2 - cyclohexyl - 1-propene.

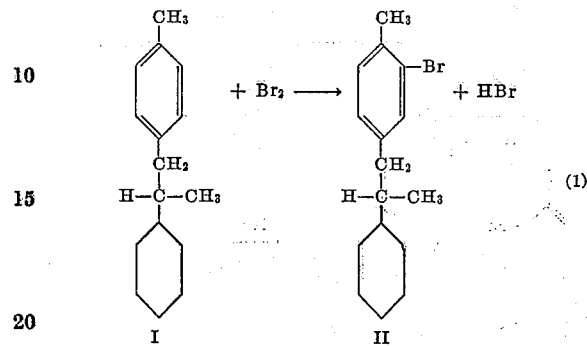

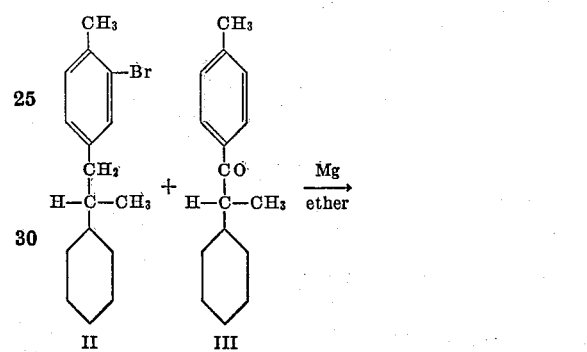

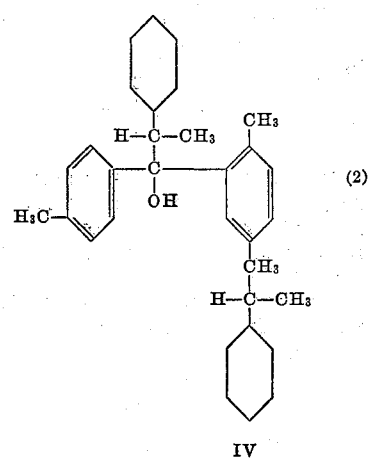

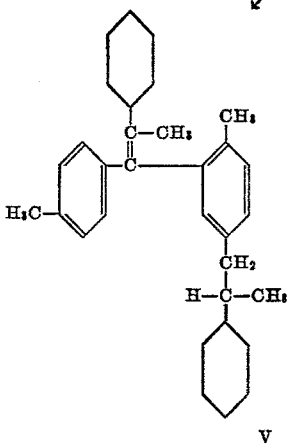

(3)

The process for producing an alkylphenyl-alkyl cycloalkalkyl phenyl-cycloalkyl-alkene may also be illustrated by the following more general equations:

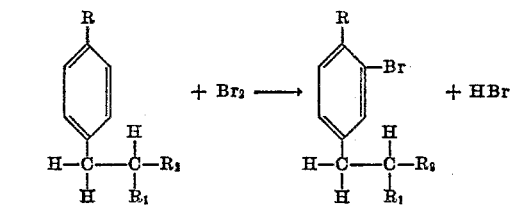

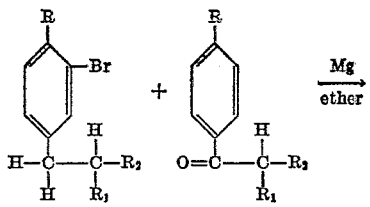

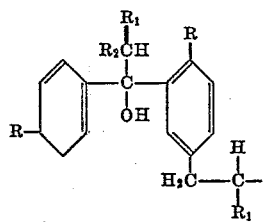

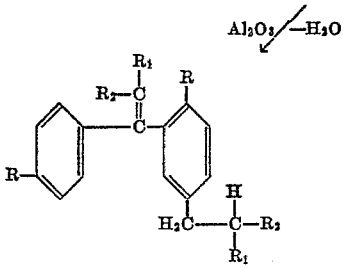

In the above indicated general equations R represents a straight chain alkyl group, $R_1$ represents a member of the group consisting of an alkyl group and a cycloalkyl group, and $R_2$ represents a cycloalkyl group.

The nature of this invention is illustrated further by the following example which should not be misconstrued to limit unduly its generally broad scope.

Compound II which is referred to in Equation 1 is prepared by reacting 0.25 mol of compound I with 0.25 mol of bromine containing 0.5% by weight of iodine, the iodine being employed as a bromination catalyst. In this conversion a 70% yield of compound II is obtained.

The reaction represented by Equation 2 is then carried out by reacting 0.15 mole of compound II with 0.14 gram atom of magnesium and 0.14 mole of the ketone (compound III of Equation 2) in 150 ml. of anhydrous ether. The resultant Grignard complex is decomposed with an aqueous solution of ammonium chloride and the resultant alcohol (compound IV) is recovered and dehydrated catalytically over activated alumina. This dehydration of the alcohol is accomplished by dissolving compound IV in three times its weight of tert-butyl-alcohol and passing the resultant solution over activated alumina maintained at a temperature of 290° C. The resultant mixture of isobutylene, water, and 1-(4-methylphenyl)-1-(2-methyl-5-(2-cyclohexylpropyl)-phenyl)-2-cyclohexyl-1-propene, indicated in Equation 3 as compound V is then separated and the desired latter high molecular weight olefin is recovered and purified by fractional distillation of subatmospheric pressure.

We claim as our invention:

1. A di-(alkylphenyl)-alkene having the formula:

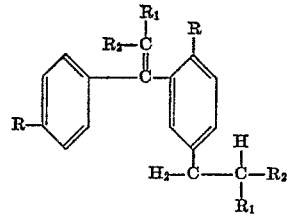

wherein R represents a straight chain alkyl group, $R_1$ represents a member of the group consisting of an alkyl group and a cycloalkyl group, and $R_2$ represents a cycloalkyl group.

2. A 1-(4-alkylphenyl) - 1 - (2-alkyl-5-cycloalkalkyl)-phenyl-2-cycloalkyl-1-alkene in which the alkene group contains at least three carbon atoms.

3. 1-(4 - methylphenyl) - 1 - (2 - methyl-5-(2-cyclohexylpropyl) - phenyl)-2-cyclohexyl-1-propene.

HERMAN PINES.
VLADIMIR N. IPATIEFF.

REFERENCES CITED

The following references are of record in the file of this patent:

UNITED STATES PATENTS

| Number | Name | Date |
|---|---|---|
| 2,221,271 | Smith et al. | Nov. 12, 1940 |

OTHER REFERENCES

Egloff: Physical Constants of Hydrocarbons, vol. I, page 160, and vol. IV, page 421. Pub. by Reinhold Pub. Corp., New York (2 pages).